United States Patent Office 3,080,333
Patented Mar. 5, 1963

3,080,333
TERPOLYMER LATEX OF AN UNSATURATED ESTER OF A FATTY ACID, ETHYL ACRYLATE, AND ANOTHER ACRYLIC ESTER OR A VINYL AROMATIC MONOMER
Raymond J. Kray, Berkeley Heights, and Charles A. De Fazio, Summit, N.J., assignors to Celanese Corporation of America, New York, N.Y., a corporation of Delaware
No Drawing. Filed Jan. 8, 1960, Ser. No. 1,184
23 Claims. (Cl. 260—29.6)

This invention relates to improved latices.

It is well known in the art to prepare synthetic latices based on polymers such as polyvinyl acetate for use in coating compositions. While these latices have many advantages, they may not be as good as desired in one or more properties, which minimizes their use in various applications. For example, when used in water-based paints, they may not have the desired degree of such properties as toughness, scrub resistance, lack of tackiness and impact flexibility.

It is an object of this invention to provide improved synthetic latices. It is the further object of this invention to provide synthetic latices which may be formulated into coating compositions having improved properties, e.g. toughness, scrub resistance, impact flexibility and lack of tackiness. Further objects will become apparent from the following detailed description and claims.

In accordance with one aspect of this invention, latices are prepared based on a terpolymer of a vinyl ester of a saturated fatty acid e.g. vinyl acetate, ethyl acrylate and a third comonomer which may be methyl acrylate, an alkyl methacrylate, e.g. methyl methacrylate or a vinyl aromatic hydrocarbon such as styrene. The terpolymer may contain, for example, 5% to 50% of the vinyl ester, 5% to 65% of ethyl acrylate, and 5% to 40% of the third comonomer. When methyl acrylate is the third comonomer, the terpolymer may contain, for example, 5% to 50% of vinyl acetate, 5% to 45% of ethyl acrylate and 5% to 40% of methyl acrylate; when methyl methacrylate is the third comonomer, the terpolymer may contain, for example, 15% to 45% of vinyl acetate, 40% to 60% of ethyl acrylate and 10% to 30% of methyl methacrylate; and when styrene is the third comonomer, the terpolymer may contain, for example, 5% to 35% of vinyl acetate, 55% to 65% of ethyl acrylate and 10% to 35% of styrene.

In addition to the dispersed terpolymer, the latices of this invention also contain at least one surface active agent which may, for example, be non-ionic or anionic. In addition, mixtures of different types of surface active agents may be used, e.g. of a non-ionic and an anionic surface active agent.

Some non-ionic surface active agents which may be used are condensation products of an alkyl phenol and ethylene oxide containing 8 to 9 carbon atoms in the alkyl group, and 4 to 50 oxyethylene groups, condensation products of a fatty alcohol and ethylene oxide having from 12 to 18 carbon atoms in the fatty alcohol chain and 15 to 25 oxyethylene groups, e.g. the condensation product of one mole of oleylalcohol and about 15 moles of ethylene oxide and the condensation product of one mole of cetyl alcohol and 25 moles of ethylene oxide. The non-ionic surface active agent may be present, for example, in the range of 0.5 to 10%; preferably 1 to 3% by weight of the latex.

Some anionic surface active agents which may be used are, for example, a sodium sulfonate, e.g. a sodium alkyl aryl sulfonate in which the alkyl groups contain 1 to 20 carbon atoms such as sodium dodecyl phenyl sulfate ("Santomerse No. 3"), sodium salts of alkyl sulfates (oleyl sodium sulfate, lauryl sodium sulfate), sodium salts of sulfated and sulfonated amides and amines (sodium N-methyl-N-palmitoyl tauride such as "Igepon TN 74"), sodium salts of sulfated and sulfonated esters and ethers (sodium octyl sulfosuccinate, such as "Aerosol OT") and sodium salts of alkyl sulfonates (sodium lauryl sulfonate such as "Duponol 189"). The anionic surface active agents may be present in an amount of 0.05 to 1.5%, preferably 0.1 to 0.3% by weight of the latex.

The latices of this invention may also suitably contain a water-soluble emulsifying agent of the type known in the art as a protective colloid, e.g. hydroxyethyl cellulose, which may be present, for example, in an amount of 0.10 to 3.5%, preferably 0.2 to 0.5 by weight of the composition. Hydroxyethyl cellulose is sold under the name "Cellosize WP-09," "Cellosize WP-3," "Cellosize WP-40" and "Cellosize WSLX." Other water-soluble colloidal emulsifying agents are polyvinyl alcohol, gum arabic, gum tragacanth, methyl cellulose and alkali metal and alkaline earth metal polyacrylates, e.g. sodium and calcium polyacrylates.

The latices of this invention are preferably prepared in situ by polymerizing the monomers in the presence of the emulsifying surface active agents which are present in the finished latex. The polymerization medium preferably also contains 0.05 to 0.5% by weight of an alkaline material, e.g. sodium bicarbonate to control the pH during the polymerization. In place of all or part of the vinyl acetate in the monomeric mixture may be used other monoethylenically unsaturated esters of saturated fatty acids containing 2 to 18 carbon atoms e.g. isopropenyl acetate, vinyl propionate, vinyl n-butyrate, vinyl hexoate, vinyl stearate, etc. In place of all or part of methyl methacrylate as the third comonomer may be used other alkyl methacrylates in which the alkyl group contains up to 6 carbon atoms e.g. ethyl methacrylate, propyl methacrylate, n-butylmethacrylate and n-hexylmethacrylate. In place of all or part of styrene as the third comonomer, may be used other vinyl or substituted vinyl aromatic hydrocarbons containing no ethylenic unsaturation other than that of the vinyl group and in which the vinyl group is attached directly to a carbon atom of an aromatic ring, e.g. o-, m-, and p-vinyl toluene, vinyl napthalenes and alpha-methyl styrene. In place of a single third comonomer, mixtures of various compounds of the types designated as suitable as third comonmers may be used.

The percentage of terpolymer in the latex after polymerization in many cases is fairly high, e.g. 40 to 65%, preferably 50 to 60% by weight of the latex.

In preparing the latex, the monomeric material and a free radical yielding catalyst are added to the prepolymerization mixture containing the emulsifying and surface active agents at a suitable polymerization temperature, e.g. 35° C. to 95° C. preferably 50° to 90° C. Some suitable catalysts are peroxide compounds such as hydrogen peroxide, either alone or in combination with other agents such as iron salt, zinc formaldehyde sulfoxylate or a titanous salt, alkali metal persulfates such as potassium persulfate, and redox systems such as potassium persulfate and sodium bisulfate, ammonium persulfate and sodium metabisulfite, a bromate mixed with a bisulfite, etc. The proportion of catalyst may be varied widely, one suitable range being 0.1% to 1.0% preferably 0.1% to 0.4% by weight of the composition.

The polymer particles in the latices of this invention are generally of fairly small size. Usually they are in the range of 0.1 to 1.0 microns.

The latices of this invention may be blended with various solid materials, e.g. pigments, fillers and extenders in the formulation of water-based paints and other coating compositions. Some of the materials which may be added are; titanium dioxide, such as "Titanox RA–50," lithopones such as "Albalith 14," antimony oxides, barytes, diatomaceous earth, e.g. "Celite 281," talc such as "Nytal 300," clay such as "ASP 400," mica, for example, 325 mesh waterground mica, red, yellow, black and brown iron oxides, e.g. "Irox Red 1380," and "Mapico Brown," maroon oxides, metallic brown, cadmium red, toluidine red, para red, lithol toner, cadmium yellow, hansa yellow, benzidine yellow, dinitraniline orange, chromium oxide green, phthalocyanine green, phthalocyanine blue, lampblack, carbon black, mineral black metallic flakes and powders such as those of aluminum and copper and luminous pigments. Mixtures of more than one of these materials may, of course, also be used.

The amount of pigment in the paint may be varied widely depending on the use intended. However, the pigment will often be in the range of 1 to 70% P.V.C., preferably 1 to 12% for gloss paints, 25% to 40% for semigloss paints and 40 to 70% for flat paints. The P.V.C. value is the pigmented volume concentration which is defined in the art as the volume of pigment divided by the sum of the volume of pigment and the volume of non-volatile vehicles in the paint.

Particularly desirable latices are obtained when the monomer of the terpolymer are emulsion polymerized in an aqueous solution of a condensation product of ethylene oxide and octyl or nonyl phenol containing at least 8 oxyethylene groups as a non-ionic surface active agent, an anionic surface active agent which is suitably a sodium alkyl aryl sulfonate and a protective colloid which is suitably hydroxyethyl cellulose, wherein the surface active agents of each type and the protective colloid are present within the proportional ranges stated above. When these latices are mixed with a pigment such as titanium dioxide within the range from 40 to 55% P.V.C., paints having particularly desirable properties are obtained.

The following examples further illustrate the invention. All percentages are by weight unless otherwise indicated.

*Example I*

A prepolymerization mixture was prepared by dissolving 4 parts of hydroxyethyl cellulose, 16 parts of a condensation product of 9 to 10 moles of ethylene and one mole of nonyl phenol, 4 parts of a condensation product of 20 moles of ethylene oxide and one mole of nonyl phenol, 2 parts of a condensation product of 4 moles of ethylene oxide and one mole of nonyl phenol, 2 parts of dodecyl phenyl sodium sulfonate and 1.2 parts of sodium bicarbonate in 482 parts of water at 60° C. with stirring. 1.6 parts of potassium persulfate were then added to the stirred solution at 60° C. and a mixture of 260 parts of vinyl acetate, 186 parts of ethyl acrylate and 85 parts of methyl acrylate were added at a polymerization temperature of 78 to 80° C. During the polymerization an additional 0.8 part of potassium persulfate was added to the batch. The polymerization was completed at 90° C. and the composition was cooled to room temperature. The latex contained 54.5% solids and had a viscosity of 1880 cps. at 25° C.

Properties of the clear latex were determined from films cast from the latex prior to pigmentation. The latex of this example had a toughness or tensile product e.g., the product of tensile strength in p.s.i. and percent elongation determined in a manner described after the examples, in excess of 440,000.

A pigment paste was prepared by thoroughly mixing 200 parts of titanium dioxide ("Titanox RA–50"), 75 parts of fine particle size calcium carbonate extender pigment ("Atomite"), 75 parts of talc ("Nytal 300"), 4 parts of soya lecithin ("R & R 551"), 151 parts of a solution of 2% methyl cellulose in water having a viscosity of 4,000 cps., 10 parts of a solution of 20% polymerized sodium salts of alkyl napthalene sulfonic acid (short chain "Daxad 11") in water and 85 parts of water. This pigment paste was mixed with the above latex to yield a paint of 40% P.V.C. based on paint solids.

The paint had a scrub-resistance in excess of 50,000 strokes when tested as indicated after the examples.

*Example II*

A latex was prepared as in Example I except that the terpolymer was prepared from 260 parts vinyl acetate, 164 parts ethyl acrylate and 106 parts of methyl acrylate; and the latex had a solids content of 54.2% and a viscosity of 2080 cps., at 25° C. A film cast from this latex had a toughness of 476,000 and a paint prepared from this latex as described in Example I had a scrub-resistance in excess of 50,000 strokes.

*Example III*

A latex was prepared as in Example I except that the terpolymer was polymerized from 260 parts of vinyl acetate, 111 parts of ethyl acrylate and 159 parts of methyl acrylate; and the latex had a solids content of 54.8% and a viscosity of 1230 cps., at 25° C. A film cast from this latex had a toughness of 569,000. A paint prepared from this latex as described in Example I had a scrub-resistance in excess of 50,000 strokes.

In addition to the excellent properties of toughness and scrub-resistance indicated, the latices of Examples I to III also exhibited little or no graininess and particularly good properties of film clarity, resistance, to water spotting, impact flexibility and flow properties, the latter indicated by a low thixotropic index.

*Example IV*

The procedure of Example I was repeated except that the latex contained 2.2 parts of hydroxyethyl cellulose, 0.55 part of dodecyl phenyl sodium sulfonate, and 10 parts of a condensation product of ethylene oxide and nonyl phenyl containing 9 to 10 oxyethylene groups as the sole surface active and emulsifying agents, only 1 part of sodium bicarbonate and 477 parts of water were used during the polymerization, and the terpolymer was polymerized from 138 parts of vinyl acetate, 330 parts of ethyl acrylate, and 83 parts of methyl methacrylate; moreover, 2 parts of potassium persulfate were added to the prepolymerization mixture and 2 parts during the polymerization. The latex had 55.8% of solids and a viscosity of 40 cps. at 25° C. A film cast from this latex had a toughness of 260,000 and a paint prepared from this latex as described in Example I had a scrub-resistance in excess of 50,000 strokes.

*Example V*

The procedure of Example IV was repeated except that the latex was prepared by polymerizing 138 parts of vinyl acetate, 275 parts of ethyl acrylate, and 138 parts of methyl methacrylate. The latex had a solids content of 55.3% and a viscosity of 40 cps. at 25° C. A film cast from this latex had a toughness of 453,000, and a paint prepared from this latex as described in Example I, had a scrub-resistance in excess of 50,000 strokes.

*Example VI*

The procedure of Example IV was followed except that the terpolymer was the polymerization product of 83 parts of vinyl acetate, 303 parts of ethyl acrylate and 165 parts of methyl methacrylate. The latex contained 55.8% solids and had a viscosity of 35 cps. at 25° C. A film cast from this latex had a toughness of 358,000 and a paint prepared from this latex, as described in Example I, had a scrub-resistance in excess of 50,000 strokes.

The latices of Examples IV to VI also exhibited little or no graininess, and had particularly good properties of impact flexibility, film clarity and resistance to water spotting.

Example VII

The procedure of Example IV was followed except that the terpolymer was the polymerization product of 55 parts of vinyl acetate, 358 parts of ethyl acrylate and 138 parts of styrene. The latex had a solids content of 55.2% and a viscosity of 160 cps. at 25° C. A film cast from the latex had a toughness of 392,000 and a paint prepared from the latex, as described in Example I, had a scrub-resistance in excess of 50,000 strokes.

Example VIII

The procedure of Example IV was followed except that the terpolymer was the polymerization product of 55 parts of vinyl acetate, 330 parts of ethyl acrylate, and 165 parts of styrene. The latex had a viscosity of 80 cps. at 25° C., and a solids content of 54.4%. A film cast from this latex had a toughness of 306,000 and a paint prepared from this latex, as described in Example I, had a scrub-resistance in excess of 50,000 strokes.

Example IX

The procedure of Example IV was followed except that the terpolymer was the polymerization product of 28 parts of vinyl acetate, 330 parts of ethyl acrylate, and 193 parts of styrene; moreover 2.5 parts of potassium persulfate were added during the polymerization rather than 2 parts. The latex had a solids content of 55.2% and a viscosity of 210 cps. at 25° C. A film cast from this latex had a toughness of 89,000 and a paint prepared from this latex, as described in Example I, had a scrub-resistance in excess of 50,000 strokes.

The latices of Examples VII to IX also possessed excellent shelf stability, little or no film graininess, and particularly good impact flexibility.

The toughness of film cast from the latices of the examples was determined by casting a film having a dry thickness of 2 to 3 mils which was aged for 72 hours at 75° F. and 50% relative humidity. The tensile strength and elongation of a strip 15 millimeters wide cut from the film were determined by using an Instron tensile tester at a 4" per minute withdrawal rate.

The scrub-resistance of the paints prepared from the lattices of the examples were determined by means of the procedure set out on pages 11 and 12 of application Serial No. 803,550, filed April 2, 1959, by Kray et al.

Having described our invention what we desire to secure by Letters Patent is:

1. A latex comprising an aqueous dispersion of a polymer of a monomeric mixture consisting essentially of a monoethylenically unsaturated ester of a fatty acid, ethyl acrylate and a monomer selected from the group consisting of methyl acrylate, an alkyl methacrylate in which the alkyl group contains up to 6 carbon atoms and a monoethylenically unsaturated vinyl aromatic hydrocarbon.

2. A latex comprising an aqueous dispersion of a polymer of vinyl acetate, ethyl acrylate and methyl acrylate.

3. A latex comprising an aqueous dispersion of a polymer of 5 to 50% of vinyl acetate, 5 to 45% of ethyl acrylate, and 5 to 40% of methyl acrylate, said percentages based on the weight of the monomeric mixture.

4. A latex comprising an aqueous dispersion of a polymer of vinyl acetate, ethyl acrylate and methyl methacrylate.

5. A latex comprising an aqueous dispersion of a polymer of 15 to 45% of vinyl acetate, 40 to 60% of ethyl acrylate, and 10 to 30% of methyl methacrylate, said percentages based on the weight of the monomeric mixture.

6. A latex comprising an aqueous dispersion of a polymer of vinyl acetate, ethyl acrylate and styrene.

7. A latex comprising an aqueous dispersion of a polymer of 5 to 35% of vinyl acetate, 55 to 65% of ethyl acrylate, and 10 to 35% of styrene, said percentages based on the weight of the monomeric mixture.

8. The latex of claim 1, containing as a non-anionic surface active agent a polyoxyethylated alkyl phenol in which the alkyl group contains 8 to 9 carbon atoms in which there are at least 4 oxyethylene units, an anionic surface active agent and a water dispersible colloidal emulsifying agent.

9. The latex of claim 2 containing as a non-anionic surface active agent a polyoxyethylated alkyl phenol in which the alkyl group contains 8 to 9 carbon atoms in which there are at least 4 oxyethylene units, an anionic surface active agent and a water dispersible colloidal emulsifying agent.

10. The latex of claim 4 containing as a non-anionic surface active agent a polyoxyethylated alkyl phenol in which there are at least 8 oxyethylene units, an anionic surface active agent and a water dispersible colloidal emulsifying agent.

11. The latex of claim 6 containing as a non anionic surface active agent a polyoxyethylated alkyl phenol in which the alkyl group contains 8 to 9 carbon atoms in which there are at least 8 oxyethylene units, an anionic surface active agent, and a water dispersible colloidal emulsifying agent.

12. A water-based paint comprising the latex of claim 1 and a pigment.

13. A water-based paint comprising the latex of claim 2 and a pigment.

14. A water-based paint comprising the latex of claim 4 and a pigment.

15. A water-based paint comprising the latex of claim 6 and a pigment.

16. A process comprising dispersing monomers consisting essentially of a monethylenically unsaturated ester of a fatty acid, ethyl acrylate, and a third comonomer selected from the group consisting of methyl acrylate, and alkyl methacrylate, in which the alkyl group contains up to 6 carbon atoms, and a monoethylenically unsaturated vinyl aromatic compound, a water and polymerizing said compounds with the aid of a free radical yielding catalyst.

17. A process comprising dispersing vinyl acetate, ethyl acrylate and methyl acrylate in water, and polymerizing said compounds with the aid of a free radical yielding catalyst.

18. A process comprising dispersing vinyl acetate, ethyl acrylate and methyl methacrylate in water, and polymerizing said compounds with the aid of a free radical yielding catalyst.

19. A process comprising dispersing vinyl acetate, ethyl acrylate and styrene in water, and polymerizing said compounds with the aid of a free radical yielding catalyst.

20. The process of claim 16 in which said water contains dissolved therein a polyoxyethylated alkyl phenol in which the alkyl group contains 8 to 9 carbon atoms and which contains at least 4 oxyethylene groups, an anionic surface active agent and a water dispersible colloidal emulsifying agent.

21. The process of claim 17 in which said water contains dissolved therein a polyoxyethylated alkyl phenol in which the alkyl group contains 8 to 9 carbon atoms and which contains at least 4 oxyethylene groups, and anionic surface active agent and a water dispersible colloidal emulsifying agent.

22. The process of claim 18 in which said water contains dissolved therein a polyoxyethylated alkyl phenol in which the alkyl group contains 8 to 9 carbon atoms and which contains at least 8 oxyethylene groups, an anionic surface active agent and a water dispersible colloidal emulsifying agent.

23. The process of claim 19 in which said water contains dissolved therein a polyoxyethylated alkyl phenol in which the alkyl group contains 8 to 9 carbon atoms and which contains at least 8 oxyethylene groups, an anionic surface active agent and a water dispersible colloidal emulsifying agent.

(References on following page)

References Cited in the file of this patent

UNITED STATES PATENTS

| | | |
|---|---|---|
| 2,320,924 | Gift | June 1, 1943 |
| 2,548,186 | Wolf | Apr. 10, 1951 |
| 2,567,678 | Morrison | Sept. 11, 1951 |
| 2,601,315 | Morrison | June 24, 1952 |
| 2,868,748 | Frazier et al. | Jan. 13, 1959 |